United States Patent Office 3,541,012
Patented Nov. 17, 1970

3,541,012
LUBRICANTS AND FUELS CONTAINING IMPROVED ACYLATED NITROGEN ADDITIVES
Carl W. Stuebe, Euclid, Ohio, assignor to The Lubrizol Corporation, Wickliffe, Ohio, a corporation of Ohio
No Drawing. Filed Apr. 15, 1968, Ser. No. 721,207
Int. Cl. C10m *1/32*
U.S. Cl. 252—51.5       38 Claims

ABSTRACT OF THE DISCLOSURE

An improved process for preparing oil-soluble acylated nitrogen compositions suitable as additives in lubricants and fuels comprising preparing the oil-soluble acylated nitrogen composition according to usual procedures contacting the resulting acylated nitrogen composition with a substantially insoluble, acidic, solid material, and thereafter removing solid materials from the acylated nitrogen composition. A preferred substantially insoluble, acidic, solid material is an acidified clay.

---

This invention relates to an improved process for preparing oil-soluble acylated nitrogen compositions, the acylated nitrogen compositions thus produced, and to lubricants and fuels containing these compositions. Specifically, the invention is concerned with the treatment of a reaction mixture containing the acylated nitrogen compositions with insoluble, solid acidic materials and thereafter removing all solid materials from the treated reaction mass. Acylated nitrogen compositions produced in this manner exhibit superior properties in some areas when employed as lubricant additives when compared to compositions which have not been so treated.

The general procedure for preparing oil-soluble acylated nitrogen compositions for use as lubricant and fuel additives is well-known in the art. Specific procedures for preparing acylated nitrogen compositions are disclosed, for example, in commonly assigned U.S. Patents 3,087,-936; 3,163,603; 3,172,892; 3,219,666; 3,240,575; 3,256,-185; 3,272,746; 3,341,542; and 3,366,569. Similarly, these acylated nitrogen compositions, as well as their various uses, are also disclosed in U.S. Patents 3,223,495; 3,312,-619; 3,324,033; 3,338,831; 3,347,645; 3,359,204; and 3,-367,864. Since the present invention involves an improvement in the process for preparing acylated nitrogen compositions of the type described in detail in these patents, they are incorporated by reference to more clearly identify the process. As is clear from these incorporated patents, the acylated nitrogen compositions are primarily useful as sludge-dispersing additives in lubricants and fuels although they have acquired other utility such as being intermediates in the preparation of other products.

Briefly, the acylated nitrogen compositions are prepared by reacting a suitable acylating agent with a nitrogen-containing reactant characterized by the presence within its structure of at least one >NH group using conventional techniques and reaction conditions for the formation of acylated nitrogen compounds. Upon completion of the reaction, it is customary to separate any insoluble solid material which may have been produced during the reaction or which is added (e.g., filter aids and the like) before using the product as an additive.

It has now been determined that the properties of the acylated nitrogen compositions can be improved if the reaction mixture resulting from the reaction of the acylating agent and the nitrogen containing reactant is treated with at least one acidic, solid, substantially insoluble material.

In accordance with the foregoing, it is a principal object of this invention to provide an improved process.

Another object of the invention is to provide acylated nitrogen compositions having improved properties.

A further object of this invention is to provide lubricant and fuel compositions containing these improved acylated nitrogen compositions.

These and other objects of this invention are achieved by providing an improvement in the process for preparing oil-soluble acylated nitrogen compositions characterized by the presence within their structure of (A) at least one substantially aliphatic high molecular weight carboxylic acid radical selected from the class consisting of acyl, acylimidoyl, and acyloxy radicals wherein the radical contains at least about fifty aliphatic carbon atoms exclusive of carbon atoms in the acid function of the acid radical and (B) a nitrogen-containing group characterized by at least one nitrogen atom attached directly to said acid radical through an acyl, acylimidoyl, or acyloxy radical, said process comprising reacting a high molecular weight acylating agent containing at least about fifty aliphatic carbon atoms exclusive of carbon atoms in the carboxylic acid function with a nitrogen containing reactant characterized by at least one group of the formula >NH to form the reaction mixture containing the desired acylated nitrogen composition and thereafter separating insoluble solid matter from this reaction mixture, the improvement in the process which comprises treating said reaction mixture with an acidic, substantially insoluble, solid material by intimately contacting the reaction mixture with said acidic material and thereafter removing insoluble solids from the treated reaction mixture. The acylated nitrogen compositions of this invention are those remaining in the treated reaction mixture after removing insoluble solids while the lubricants and fuels contemplated are those containing the acylated nitrogen compositions thus produced.

The process for preparing the acylated nitrogen compositions as described in the prior art involves reacting at least one substantially aliphatic high molecular weight mono- or polycarboxylic acid acylating agent characterized by the presence within its structure of at least about fifty aliphatic carbon atoms with a suitable nitrogen-containing reactant characterized by at least one >NH group. The acylating agent is characterized by the presence of at least one group of the formula

wherein X is halogen, hydroxy, hydrocarbyloxy (e.g., lower alkoxy), acyloxy, and the like. In other words, the group

is a carboxyl group or a functional derivative of a carboxyl group which is reactive with amines containing active amino hydrogens. This process involves a reaction between the

group of the acylating agent and the >NH group of the nitrogen compound and results in the direct chemical attachment of at least one nitrogen atom to the acylating agent through an acyl, acylimidoyl, or acyloxy radical. The linkage formed between the nitrogen atom and the polar radical may, thus, be that characteristic of an amine salt

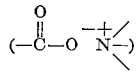

and amide

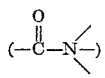

an imide

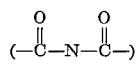

or amidine radical (—N=C—N<). In most instances, the reaction product of the above process contains a mixture of acylated nitrogen compositions. To illustrate, the reaction involving an acid or anhydride group with an amino nitrogen-containing compound at relatively low temperatures such as below about 60° C. results predominantly in an amine salt linkage but at higher temperatures such as above about 80° C., predominantly amide, imide, or amidine linkages are produced. Preferably, the reaction is carried out at a temperature of about 100° C. to about 250° C. so that the acylated nitrogen composition contains amides, imides, amidines, or mixtures of these.

The process is generally conducted in the presence of inert liquid diluents such as liquid hydrocarbons and halohydrocarbons, ethers, and other conventional liquid diluents used in chemical processes. Specific suitable diluents include benzene, toluene, naphthas, mineral oils, xylene, cyclohexane, n-hexane, n-heptene, chlorobenzenes, and the like. Preferably, the diluent will be a solvent for the acylating agent and the acylated nitrogen-containing composition produced. Mineral oil constitutes a preferred diluent either as the only diluent or in combination with other liquid diluents such as benzene, toluene, and the like.

The relative proportions of the acylating agent and the nitrogen-containing reactants used in the above process are such that at least one-half of a stoichiometrically equivalent amount of a nitrogen-containing reactant is used for each equivalent of the acylating agent. As used herein the equivalent weight of the nitrogen-containing reactant is based upon the number of the nitrogen-containing radicals defined by the group >NH. Similarly, the equivalent weight of the acylating agent is based upon the number of the radicals defined by the group

present in the acylating agent. Thus, ethylene diamine has two equivalents per mole; amino guanidine has four equivalents per mole; a succinic acid or ester has two equivalents per mole; etc. The upper limit of the useful amount of the nitrogen-containing compound appears to be about two moles for each equivalent of the acid-producing compound used. Beyond this limit, the excess amount of the nitrogen-containing reactant does not appear to take part in the reaction. On the other hand, the lower limit of about one-half equivalent of the nitrogen-containing reactant used for each equivalent of the acylating agent is based upon the stoichiometry for the formation of products having predominantly imide linkages. A generally preferred amount of the nitrogen-containing reactant is approximately one to two equivalents for each equivalent of the acylating agent used.

As mentioned hereinabove, the high molecular weight acylating agents used in the process are mono- and poly- carboxylic acid acylating agents containing at least about fifty aliphatic carbon atoms. These acids are well-known in the art and typical examples thereof are described in the above-incorporated patents. A preferred group of acylating agents are the substituted succinic anhydrides where the substituent is derived from a polymerized olefin or chlorinated polymerized olefin, especially polymerized 1-monoolefin or a chlorinated polymerized 1-monoolefin having at least about fifty aliphatic carbon atoms. Those acylating agents characterized by substituents having an average molecular weight of from about 700 to about 5000 are particularly preferred due to the good sludge-dispersing capabilities of acylated nitrogen compositions produced therefrom.

As shown in the above-incorporated patents, these substituted succinic acids can be prepared readily according to known techniques by reacting the polymerized olefins or chlorinated polymerized olefins with maleic anhydride. Those substituted succinic anhydrides wherein the substituent is derived from polypropylene, chlorinated polypropylene, propylene-isobutylene copolymers and chlorinated copolymers, polyisobutylene, or chlorinated polyisobutylene are especially preferred due to their commercial importance.

The amino nitrogen-containing reactants suitable for use in preparing the acylated nitrogen can be quite diverse and include aliphatic amines, aromatic amines, heterocyclic amines, or cycloaliphatic amines. The amines may be primary or secondary amines and may also be polyamines such as alkylene amines, arylene amines, cyclic polyamines, and the hydroxy-substituted derivatives of such polyamines. Specific amines include mehylamine, N-methylethylamine, N-methyl-octylamine, N-cyclohexylaniline, dodecylamine, o-phenylenediamine, piperazine, cyclohexylamine, ethanolamine, diethanolamine, hydrazine, phenyl-hydrazine, urea, thiourea, n-butylurea, guanidine, dicyandiamide, N-(2-hydroxyethyl)ethylenediamine, N,N'-bis(2-hydroxyethyl)ethylenediamine, 1-(2-hydroxyethyl)piperazine, N-(3-hydroxypropyl)tetramethylenediamine, and the like.

However, the preferred amino-nitrogen containing reactants are the alkylene polyamines correspondng to the general formula

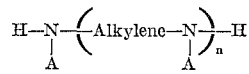

where $n$ is an integer preferably less than about 10, each A is independently hydrocarbyl, hydroxy-substituted hydrocarbyl, amino-substituted hydrocarbyl or hydrogen, and the alkylene radical is preferably a lower alkylene radical having less than about 8 carbon atoms. A is preferably hydrogen and when other than hydrogen, they are preferably lower alkyl of up to seven carbon atoms, hydroxy-lower alkyl, or amino-lower alkyl. The alkylene amines include principally methyleneamines, ethyleneamines, butyleneamines, propyleneamines, hexyleneamines, and other polymethyleneamines. These are exemplified by ethylenediamines, triethylenetetramines, propylenediamines, decamethylenediamine, octamethylenediamines, di-(hepthylmethylene)triamine, tripropylenetetramine, tetraethylenepentamine, pentaethylenehexamine, and the like.

The ethyleneamines have been found to be especially useful. They are described in some detail under the heading "Ethylene Amines" in "Encyclopedia of Chemical Technology," Kirk and Othmer, vol. 5, pp. 898–905, Interscience Publishers, New York (1950). Such compounds are prepared most conveniently by the reaction of an alkylene chloride with ammonia. The reaction results in the production of somewhat complex mixtures of ethyleneamines including cyclic condensation products such as piperazine. On the other hand, quite satisfactory products may be obtained also by the use of pure ethyleneamines. An especially useful source of ethyleneamines for reasons of economy, as well as effectiveness of the products derived therefrom, is a mixture of ethyleneamines prepared by the reaction of ethylene chloride and ammonia containing 3–7 amino groups per molecule.

The improvement in this basic process as described herein contemplates the subsequent treatment of the acylated nitrogen composition with other materials prior to the treatment with the acidic, substantially insoluble, solid material of the present invention. For example, it has been found desirable to post-treat the acylated nitrogen compositions with such materials as carbon disulfide, nitriles, epoxides, aldehydes, ketones, ureas, thioureas, guanidines, formic acid, and the like in order to improve their properties for various applications. These post-treatments of the acylated nitrogen compositions are disclosed in detail in the following U.S. patents which are herein incorporated by reference: 3,185,704; 3,256,185; 3,278,550; 3,280,034; 3,312,619; and 3,373,111. When it is desired to post-treat the acylated nitrogen compositions according to the procedures outlined in one of these patents, such post-treatment normally will be conducted prior to the incorporation of the acidic solid materials required in the post-treatment process of the present invention.

It is to be understood that the reaction mixture containing the acylated-nitrogen compositions may be filtered or otherwise treated to remove solids prior to treatment according to the improvement of the present invention, if desired. However, this is not necessary and removal of solid matter from the reaction mixture can be deferred entirely until post-treatment with the solid, acidic material is complete.

The identity of the acidic, substantially insoluble, solid materials used in the post-treatment process invention is not critical. All that is required is that the material be substantially insoluble so that, after post-treatment, it can be removed by filtration, centrifuging, or other conventional means for eliminating solids from liquid products. This requires that the acidic material be substantially insoluble in the reaction mixture resulting from the above-described process since that is the environment in which it is to be used. Thus, the terminology "substantially insoluble" means that the material should be insoluble in the diluent or diluents used in the foregoing process and the resulting acylated-nitrogen composition thereby produced.

From a practical viewpoint, the acidic material usually will be an acidic resin (e.g., a cation-exchange resin) or an acidified earth. Both types of materials are well-known in the art. For example, the Merck Index (7th edition, 1960) lists many commercial cation exchange resins at pages 1573–1585 which are suitable for use as solids, acidic materials in the present post-treatment process. Ordinarily, the cation-exchange resins will contain carboxylic, phosphoric, or sulfonic acid groups and be of the ($H^+$) type. The resins should be heat-stable at temperatures of 60° C. or above. Usually, the resins chosen will be those stable at temperatures within the range of about 80° C. to about 150° C.

The preferred solid acidic materials, however, are the acidified inorganic materials, particularly acidified earths or acidified clays (sometimes referred to as activated clays). These materials are well-known and are described, for example, in Kirk-Othmer, Encyclopedia of Chemical Technology (2nd. ed.), vol. 3, pages 354–355, (1964). Acidified clays are usually acidified bentonite clays prepared by treating the clay with an inorganic acid such as sulfuric acid, phosphoric acid, hydrochloric acid, and the like, according to known procedures. Again, these acidified clays are commercially available materials.

The improved process of the present invention involves intimately contacting the reaction mixture containing the acylated nitrogen composition and the substantially insoluble, solid, acidic material while maintaining a temperature of about 50°–200° C., but preferably not more than about 150° C. Temperatures of about 70°–120° C. are particularly effective with temperatures of 80°–110° C. being preferred, especially when the acidic substantially insoluble solid material is an acidified clay. The contacting of the reaction mixture and the acidic material is facilitated through stirring or other means of agitation.

The amount of solid, substantially insoluble, acidic material which is used to treat the reaction mixture can vary over a wide range, for example, from about 0.1% to about 20% by weight based on the weight of the reaction mixture to be treated. As will be apparent to those skilled in the art, the optimum amount to be used in any given application will depend upon the reaction mixture that is to be treated and the particular acidic material employed. Generally, however, good results are obtained when the amount of acidic material varies between about 1% and about 10% by weight. The optimum amount for any given application will usually fall within this latter range and frequently within the range of about 2% to about 7% by weight.

As with the amount of acidic materials to be used, the period of time in which the reaction mixture and the acidic material are to be kept in contact will vary with the particular reaction mixture and the particular acidic material. In addition, other obvious variables can effect the optimum period of contact such as the amount of acidic material employed, the quantity of reaction mixture to be treated, and the temperature maintained during the post-treatment process, the agitation, if any, of the mixture, etc. Thus, the post-treatment duration may vary from a few minutes to twenty-four hours or more. However, it has been found that, as a general rule, completely satisfactory results are obtained when the reaction mixture and the acidic material are contacted for periods of about one-half hour to about six hours.

The manner in which the post-treatment of this invention improves the characteristics of the acylated nitrogen-containing composition is not understood. It it believed that the acidic groups of the acidic material react with impurities which may have been present in the starting materials from which the acylated nitrogen composition was prepared or with undesirable side products produced in the reaction. Regardless of the mechanism by which the post-treatment process functions, the acylated nitrogen compositions which have been post-treated in this manner exhibit improved properties when compared with those which have not been so post-treated.

The following examples further illustrate the present invention. As used in these examples, the specification, and the appended claims, the terms "parts" and "percent" refer to parts-by-weight and percent-by-weight, respectively, unless otherwise indicated.

EXAMPLE 1

(A) To 516 parts of a polyisobutenyl-substituted succinic anhydride (average molecular weight about 1000–1100) there is added over a 3.2-hour period, while maintaining a temperature of about 93°–116° C., 77 parts of a commercially available alkyleneamine mixture having a nitrogen content of about 33.5% and an average composition corresponding to pentaethylenehexamine. The resulting mixture is then heated to about 200° C. over a 3-hour period and maintained at 200°–210° C. while lowering the pressure to 200 mm. (Hg) and venting. The mixture is then diluted with 445 parts of mineral oil and filtered. The filtrate contains about 43% oil and is an oil solution of the desired acylated nitrogen composition.

(B) The procedure of (A) is repeated to produce 3000 parts of the same acylated nitrogen composition. Then 150 parts of an acidified clay (sold as Super Filtrol Grade 1 by the Filtrol Corporation, and having an acidity value of 8, expressed as mg. KOH/gm.) is added and the mixture is heated at 95°–100° C. for two hours with stirring and filtered. The filtrate is a 43% oil solution of the desired acylated nitrogen composition prepared according to the improved process of the present invention.

EXAMPLE 2

(A) A mixture comprising 650 parts of polyisobutenyl-substituted acrylic acid (having an average molecular weight of about 900–1000) and 478 parts of mineral oil is heated to about 60° C. and 62 parts of the alkylenepolyamine of Example 1(A) are added. The resulting mixture is then heated to about 215° C. over a 6.8–hour period and then blown with nitrogen at this temperature at 5 parts per hours for 0.3 hour. The reaction mixture is a 40.5% oil solution of the desired acylated nitrogen composition.

(B) 400 parts of the product of 2(A) and 20 parts of the acidified clay identified in 1(B) are heated with agitation at 93°–98° C. for one hour and filtered. The filtrate is an oil-solution of the desired acylated nitrogen composition produced according to the improved process of the present invention.

EXAMPLE 3

(A) A mixture comprising 592 parts of mineral oil, 115.5 parts of a commercially available mixture of ethylenepolyamine having an average composition corresponding to that of tetraethylenepentamine is heated to and maintained at about 120°–125° C. while 785 parts of polyisobutenyl-substituted succinic anhydride of Example 1(A) are added over a 2-hour period. The resulting mixture is then heated to 148°–155° C. and blown with nitrogen at 20 parts per hour for five hours at this temperature. The reaction mixture is filtered producing a filtrate which is a 40% oil solution of the desired acylated nitrogen composition.

(B) A mixture compirsing 5000 parts of a filtrate prepared according to 3(A) and 250 parts of the acidified clay of Example 1(B) is heated with stirring at 95°–100° C. for three hours and filtered. The filtrate is a 40% oil solution of an acylated composition post-treated according to the improved process of the present invention.

EXAMPLE 4

(A) An oil solution of the acylated nitrogen composition prepared as in Example 3(A) is mixed with 3% of the acidified clay of 1(B), heated with stirring at 93°–95° C. for three hours and filtered.

(B) An oil solution of the acylated nitrogen composition prepared according to Example 3(A) is mixed with 3% of the acidified clay of Example 1(B) and heated with stirring to about 150° C. over a 2.5-hour period and maintained at this temperature for one hour. Then the mixture is blown with nitrogen at 10 parts per hour for 0.5 hour and filtered.

EXAMPLE 5

A mixture of 602 parts of mineral oil, 800 parts of the polyisobutene-substituted succinic anhydride of Example 1(A), and 121 parts of the alkylenepolyamine mixture of Example 3(A) is prepared at 60°–82° C., heated to 150° C. in six hours, and then blown with nitrogen at 150° C. for five hours. To the residue there is then added 56 parts of carbon disulfide at 143°–150° C. over a 1-hour period. This mixture is maintained at 143°–150° C. for one hour and blown with nitrogen at 150° C. for three hours. The residue is filtered. The filtrate contains 2.53% of nitrogen, 1.7% of sulfur, a base number of 14.7 at pH of 4, and an acid number of 1.2 at pH of 12.

A reaction mixture comprising 2500 parts of a filtrate containing a carbon disulfide post-treated acylated nitrogen composition as prepared above, 2500 parts of the product of Example 3(A), and 150 parts of the acidified clay of Example 1(B) are heated at about 100° C. for about one hour and filtered. The filtrate is a combination of acylated nitrogen compositions prepared according to the improved process of the present invention.

By following the general procedures of the foregoing examples, other acylated nitrogen compositions of the type disclosed in the above-incorporated patents can be successfully employed in the improved process of the present invention.

As mentioned above, the post treated acylated nitrogen compositions produced by the process of this invention are useful as additives in lubricants and fuels in the same manner as the acylated nitrogen compositions of the prior art. For example, they function effectively as sludge-dispersants in both lubricants and fuels. When employed as lubricating oil additives they are usually present in amounts from about 0.01 to about 30% by weight in the final lubricating composition. Ordinarily, when used as additives for lubricating oil compositions, the acylated nitrogen compositions prepared according to the improved process of this invention will be present in amounts of from 0.5% to about 10% by weight although, under unusually adverse conditions, such as in the operation of diesel engines, they may comprise up to about 30% by weight of the lubricating composition.

When employed in lubricating oils, the post-treated acylated nitrogen compositions may be used alone or in combination with other dispersants or detergents. In addition, the lubricating composition may contain rust inhibitors, oxidation inhibitors, viscosity index improving agents, extreme pressure additives, and the like. Typical examples of these additional lubricant additives are contained in the above-incorporated patents.

The additives of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, penta-erythritol, etc.). Specific examples of these esters include dibutyl adipate, di(2-ethylhexyl) sebacate, di - n - hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or poly-aryloxy-siloxane oils and silicate oils comprise another useful class of synthetic lubricants (e.g., tetraethyl-silicate, tetraisopropyl-silicate, tetra(2-ethylhexyl)-silicate, tetra-(4-methyl-2-tetraethyl)-silicate, tetra - (p - tert - butyl-phenyl) - silicate, hexyl - (4 - methyl - 2 - pentoxy)-di-siloxane, poly(methyl) - siloxanes, poly(methylphenyl)-siloxanes, etc.). Other synthetic lubricating oils include liquid esters of phosphorus-containing acids (e.g., tri-cresyl phosphate, trioctyl phosphate, diethyl ester of dec-ane phosphonic acid, etc.), polymeric tetrahydrofurans, and the like.

In fuels, the acylated nitrogen compositions promote engine cleanliness by reducing or eliminating harmful deposits in the fuel system, engine, or exhaust system. They are primarily intended for use in the normally liquid petroleum distillate fuels, that is, the petroleum distillates which boil in the range characteristic of petroleum fuels such as gasolines, fuel oils, diesel fuels, aviation fuels, kerosene and the like. When employed in fuels they are generally present in lower concentrations than in lubricants, for example, in amounts of from about 0.001% to about 2% by weight and generally in amounts of from about 0.01% to about 1% by weight. As in the case of lubricants, other conventional additives can be present in the fuel compositions contemplated by the present invention. These additional additives include lead scavengers, deicers, anti-screen clogging agents, demulsifiers, smoke-suppressants, and the like.

The following illustrate compositions of the type contemplated by the present invention.

Composition A

SAE 10W–30 mineral lubricating oil containing 4% of the product of Example 1(B).

Composition B

SAE 20 mineral lubricating oil containing 2.5% of the product of Example 3(B), 0.75% phosphorus as zinc dioctyl phosphorodithioate, 2% of a barium detergent prepared by neutralizing with barium hydroxide a hydrolyxed reaction product of a propylene (average molecular weight 2000) with one mole of phosphorus pentasulfide and one mole of sulfur, 3% of a barium sulfonate detergent prepared by carbonating a mineral oil solution of mahogany acid and a 500% stoichiometric excess amount of barium hydroxide in the presence of octyl phenol as the promoter at 180° C., 3% of a supplemental ashless dispersant prepared by copolymerizing a mixture of 95% by weight of decylmethacrylate and 5% by weight diethylaminoethylacrylate.

Composition C

SAE 30 mineral lubricating oil containing 3% of the product of Example 5, 0.1% of phosphorus as the zinc salt of a mixture of equal molar amounts of di-isopropyl phosphorodithioic acid and di-n-decyl phosphorodithioic acid, and 2.5% of sulfate ash as a basic barium detergent prepared by carbonating at 150° C. a mixture comprising mineral oil, barium di-dodecylbenzene sulfonate and 1.5 moles of barium hydroxide in the presence of a small amount of water with .07 moles of octyl phenol as the promoter.

Composition D

Diesel fuel containing 0.15% of the product of Example 1(B).

Composition E

Kerosene containing 0.25% of the product of Example 2(B).

Composition F

Gasoline containing 0.015% of the product of Example 4(A).

The foregoing compositions illustrate types of compositions contemplated by the present invention. Many additional compositions apparent to those skilled in the art are available simply by replacing all or part of the acylated nitrogen compositions employed in the fuels and lubricants described in the above-incorporated patents with an equivalent amount of the acylated nitrogen compositions of this invention. Obviously, optimum amounts for any application will depend upon the particular additive or additive combinations selected and the specific environment in which the fuel or lubricant is to be used. These optimum amounts can be ascertained through conventional evaluation techniques commonplace in the industry.

The improved performance of the acylated nitrogen compositions produced according to the process of this invention is demonstrated in an engine test using a four-stroke diesel engine having a compression ratio of 15:1 operated for a specified period of time under the following conditions: Speed, 1000 r.p.m.; B.t.u. input per minute, 2900–3000; load, 20 brake horsepower; water jacket outlet temperature 175°–180° F.; oil temperature, 140°–150° F. The lubricating composition is evaluated according to the piston cleanliness using a rating scale of 0–100 where 100 is indicative of no deposits and 0 being indicative of heavy deposits. The amount of ring filling is also reported. The test results obtained demonstrate the superiority of the acylated nitrogen compositions of the present invention.

TABLE.—ENGINE TEST RESULTS

| Test | Composition | Test duration, Hours | Piston cleanliness rating | Percent ring filling |
|---|---|---|---|---|
| I | (A) | 120 | 92.0 | 0 |
|  | (B) | 120 | 96.5 | 11 |
|  |  | 240 | 95.0 | 12 |
|  |  | 360 | 89.5 | 10 |
| II | (A) | 145 | 94.5 | 9 |
|  |  | 240 | 94.0 | 14 |
|  |  | 360 | 96.0 | 16 |
|  |  | 480 | 96.0 | 16 |
|  | (B) | 120 | 98.5 | 1 |
|  |  | 249 | 97.5 | 1 |
|  |  | 397 | 98.0 | 1 |
|  |  | 480 | 98.0 | 1 |
| III | (A) | 120 | 93.0 | 1 |
|  |  | 150 | 95.5 | 1 |
|  | (B) | 240 | 92.0 | 0 |
|  |  | 360 | 92.0 | 1 |
|  |  | 480 | 93.5 | 1 |
| IV | (A) | 120 | 99.5 | 1 |
|  |  | 240 | 98.0 | 2 |
|  |  | 480 | 96.0 | 8 |
|  | (B) | 120 | 95.0 | 0 |
|  |  | 240 | 94.5 | 5 |
|  |  | 480 | 92.5 | 14 |
| V |  | 120 | 97.5 | 3 |

Identity of test compositions:

Composition I (A) Lubricating oil composition with 0.055% nitrogen as the filtrate of Example 1(A).

(B) Same lubricating oil composition with 0.055% nitrogen as the filtrate of Example 1(B).

Composition II (A) Lubricating oil composition with 3.67% by weight of the product of Example 2(A).

(B) Same lubricating oil composition with 3.67% by weight of filtrate of Example 2(B).

Composition III (A) Lubricating oil composition with 3.13% of the filtrate of Example 3(A).

(B) Same lubricating oil composition containing 3.10% of the filtrate of Example 3(B).

Composition IV (A) Lubricating oil composition with 2.49% of the filtrate of Example 4(A).

(B) Same lubricating oil with 2.49% of the filtrate of Example 4(B).

It has been determined that the solid acidic materials are removed by filtration more easily if they are dry, that is, substantially free from water, prior to their use according to the present invention. If a given acidic material is found to produce a mixture which is difficult to filter, this problem may be alleviated by drying the acidic material prior to using it in any conventional manner such as heating at atmospheric or sub-atmospheric pressures at suitable temperatures, that is, temperatures which do not destroy the acidic material. A convenient way for drying acidic earths or clays is to mix them with a suitable liquid organic diluent and heating the mixture to drive off water. Thus, Super Filtrol (described more fully hereinabove) can be refluxed with xylene to remove water.

What is claimed is:

1. In the process for preparing oil-soluble acylated nitrogen compositions characterized by the presence within their structure of (A) at least one substantially aliphatic high molecular weight acid radical selected from the class consisting of acyl, acylimidoyl, and acyloxy radicals wherein the radical contains at least about fifty aliphatic carbon atoms exclusive of carbon atoms in the acid function of the acid radical and (B) a nitrogen-containing group characterized by at least one nitrogen atom attached directly to said acid radical through an acyl, acylimidoyl, or acyloxy radical, said process comprising reacting a high molecular weight acylating agent containing at least about fifty aliphatic carbon atoms exclusive of carbon atoms in the acid function with a nitrogen-containing reactant selected from the group consisting of aliphatic amines, aromatic amines, heterocyclic amines and cycloaliphatic amines to form a reaction mixture containing the desired acylated nitrogen composition, and thereafter separating insoluble solid matter from the reaction mixture, the improvement in said process which comprises treating said reaction mixture by intimately contacting at a temperature of about 50°–200° C. the reaction mixture with a substantially insoluble, solid, acidic material in an amount sufficient to provide about 0.1% to about 20% by weight of acidic material based on the weight of said reaction mixture and thereafter removing insoluble solids from the treated reaction mixture.

2. The improvement in the process according to claim 1 wherein the insoluble acidic material is an acidified clay.

3. The improvement in the process according to claim 2 wherein the reaction mixture is treated with the insoluble acidic material at a temperature of from about 70°–120° C.

4. The improvement in the process according to claim 3 wherein the temperature is 80°–110°.

5. In the process for preparing oil-soluble acylated nitrogen compositions characterized by the presence within their structure of (A) at least one aliphatic high molecular weight carboxylic acid radical selected from the class consisting of carboxylic acid acyl, carboxylic acylimidoyl, carboxylic acid acyloxy radicals wherein the carboxylic acid radical contains at least about fifty aliphatic carbon atoms exclusive of carbon atoms in the carboxyl function and (B) an alkylenepolyamine radical characterized by at least one nitrogen atom attached directly to said carboxylic acid radical through a carboxylic acyl, carboxylic acylimidoyl, or carboxylic acyloxy radical, said process comprising reacting a high molecular weight carboxylic acid acylating agent containing at least about fifty aliphatic carbon atoms with an alkylene polyamine to form a reaction mixture containing the desired acylated nitrogen composition, the improvement in said process which comprises treating the reaction mixture by intimately contacting at a temperature of about 50°–150° C. the reaction mixture with an acidified clay in an amount sufficient to provide about 1% to about 10% by weight of acidified clay based on the weight of said reaction mixture, and thereafter removing solids from the treated mass.

6. The improvement in the process according to claim 5 wherein the reaction mixture is treated at a temperature of about 70°–120° C.

7. The improvement in the process according to claim 5 wherein the mixture is treated at a temperature of about 80°–110° C.

8. The process comprising intimately contacting a solution of an oil-soluble acylated nitrogen composition with about 0.1% to about 20% by weight based on the weight of said solution of a substantially insoluble, solid, acidic material at a temperature of about 50°–200° C. and thereafter removing insoluble solids from said solution, the oil-soluble acylated nitrogen composition being characterized by the presence within its structure of (A) at least one substantially aliphatic high molecular weight acid radical selected from the class consisting of carboxylic acid acyl, acylimidoyl, or acyloxy radicals wherein the radical contains at least about fifty aliphatic carbon atoms exclusive of carbon atoms in the carboxyl function of the radical and (B) a nitrogen-containing group characterized by at least one nitrogen atom attached directly to said acid radical through an acyl, acylimidoyl, or acyloxy radical, the nitrogen-containing group being derived from aliphatic amines, aromatic amines, heterocyclic amines, and cycloaliphatic amines.

9. The process of claim 8 wherein the acidic material is an acidified clay in an amount of about 1% to about 10% by weight and the temperature is maintained in a range of 50°–150° C.

10. The process of claim 9 wherein the acid radical of the acylated nitrogen composition is selected from the group consisting of a carboxylic acid acyl, carboxylic acid acylimidoyl, and carboxylic acid acyloxy radicals of substantially saturated aliphatic mono- or dicarboxylic acids.

11. The process of claim 10 wherein the acylated nitrogen composition is an acylated alkylenepolyamine.

12. The process of claim 11 wherein the acylated nitrogen-composition is a polymerized 1-monoolefin-substituted-succinic acid acylated ethylene polyamine.

13. The process of claim 12 wherein the temperature is maintained in the range of about 80°–110° C. and the acidic material is about 2% to about 7% by weight of an acidified bentonite clay.

14. The product of the process of claim 1.

15. The product of the process of claim 5.

16. The composition produced by the process of claim 8.

17. The composition produced by the process of claim 12.

18. The composition produced by the process of claim 13.

19. A lubricant or fuel comprising, respectively a major amount of a lubricating oil or normally liquid petroleum distillate fuel and an amount sufficient to impart sludge-dispensing properties of an oil-soluble acylated nitrogen composition characterized by the presence within its structure of (A) at least one substantially aliphatic high molecular weight acid radical selected from the class consisting of acyl, acylimidoyl, and acyloxy radicals wherein the radical contains at least about fifty aliphatic carbon atoms exclusive of carbon atoms in the acid function of the acid radical and (B) a nitrogen-containing group characterized by at least one nitrogen atom attached directly to said acid radical through an acyl, acylimidoyl, or acyloxy radical prepared by an improved process, said improved process comprising reacting a high molecular weight acylating agent containing at least about fifty aliphatic carbon atoms exclusive of carbon atoms in the acid function with a nitrogen-containing reactant selected from the group consisting of aliphatic amines, aromatic amines, heterocyclic amines and cycloaliphatic amines to form a reaction mixture containing the desired acylated nitrogen composition, and thereafter separating insoluble solid matter from the reaction mixture, the improvement in the process comprising treating said reaction mixture by intimately contacting at a temperature of about 50°–200° C. the reaction mixture with a substantially insoluble, solid, acidic material in an amount sufficient to provide about 0.1% to about 20% by weight of acidic material based on the weight of said reaction mixture, and thereafter removing insoluble solids from the treated reaction mixture.

20. A lubricant or fuel according to claim 19 wherein the insoluble acidic material is selected from the class consisting of acidic resins and acidified clays.

21. A lubricant or fuel according to claim 20 wherein the reaction mixture is treated with the insoluble acidic material at a temperature of from about 70°–120° C.

22. A lubricant or fuel according to claim 20 wherein the temperature is 80°–110° C.

23. A lubricant according to claim 20.

24. A lubricant or fuel comprising, respectively, a major amount of a lubricating oil or normally liquid petroluem distillate fuel and an amount sufficient to impart sludge-dispensing properties of an oil-soluble acylated nitrogen composition characterized by the presence within its structure of (A) at least one aliphatic high molecular weight carboxylic acid radical selected from the class consisting of carboxylic acid acyl, carboxylic acid acylimidoyl, carboxylic acid acyloxy radicals wherein the carboxylic acid radical contains at least about fifty aliphatic carbon atoms exclusive of carbon atoms in the carboxyl function and (B) an alkylene polyamine radical characterized by at least one nitrogen atom attached directly to said carboxylic acid radical through a carboxylic acyl, carboxylic acylimidoyl, or carboxylic acyloxy radical prepared by an improved process, said process comprising reacting a high molecular weight carboxylic acid acylating agent containing at least about fifty aliphatic carbon atoms with an alkylene polyamine to form a reaction mixture containing the desired acylated nitrogen composition, the improvement in said process which comprises treating the reaction mixture by intimately contacting at a temperature of about 50°–150° C. the reaction mixture with an acidified clay in an amount sufficient to provide about 1% to about 10% by weight of acidified clay based on the weight of said reaction mixture and thereafter removing solids from the thus treated reaction mixture.

25. A lubricant or fuel according to claim 24 wherein the reaction mixture is treated at a temperature of about 70°–120° C.

26. A lubricant or fuel according to claim 24 wherein the mixture is treated at a temperature of about 80°–110° C.

27. A lubricant according to claim 24.

28. A lubricant or fuel comprising, respectively, a major amount of a lubricating oil or a normally liquid petroleum distillate fuel and an amount sufficient to impart sludge-dispensing properties of a post-treated acylated nitrogen composition, said post-treated acylated nitrogen composition having been prepared by a process comprising intimately contacting a solution of an oil-soluble acylated nitrogen composition with a substantially insoluble, solid, acidic material selected from the class consisting of acidified clay and acidic resins at a temperature of about 50°–200° C. wherein the amount of acidic material is from about 0.1% to about 20% by weight based on the weight of solution, and thereafter removing insoluble solids from said solution, the oil-soluble acylated nitrogen composition being characterized by the presence within its structure of (A) at least one substantially aliphatic high molecular weight acid radical selected from the class consisting of carboxylic acid acyl, acylimidoyl, or acyloxy radicals wherein the radical contains at least about fifty aliphatic carbon atoms exclusive of carbon atoms in the carboxyl function of the radical and (B) a nitrogen-containing group characterized by at least one nitrogen atom attached directly to said acid radical through an acyl, acylimidoyl, or acyloxy radical.

29. A lubricant or fuel according to claim 28 wherein the acidic material is from about 1% to about 10% of an acidified clay and the temperature is maintained within the range of about 50°–150° C.

30. A lubricant or fuel according to claim 29 wherein the acid radical of said oil-soluble acylated nitrogen composition is selected from the group consisting of a carboxylic acid acyl, carboxylic acid acylimidoyl, and carboxylic acid acyloxy radicals of substantially saturated aliphatic mono- or dicarboxylic acids.

31. A lubricant or fuel according to claim 30 wherein the acylated nitrogen composition is an acylated alkylene polyamine.

32. A lubricant or fuel according to claim 31 wherein the acylated nitrogen-composition is a polymerized 1-monoolefin-substituted-succinic acid acylated ehtylene polyamine prepared by reacting a polmerized monoolefin-substituted succinic acid acylating agent with ethylene polyamine at a temperature of about 100° C. to about 250° C. in a ratio of acylating agent to ethylene polyamine of at least one-half of a stoichiometrically equivalent amount of ethylene polyamine to about two moles of ethylene polyamine for each equivalent of said substituted succinic acid acylating agents.

33. A lubricant or fuel according to claim 32 wherein said polymerized 1-monoolefin-substituted succinic acid acylating agent is the substituted succinic acid or anhydride.

34. A lubricant or fuel according to claim 33 wherein the polymerized 1-monoolefin substituent is characterized by an averge molecular weight of about 700 to about 5000.

35. A lubricant or fuel according to claim 34 wherein the temperature is maintained in the range of about 80°–110° C. and the acidic material is from about 2% to about 7% of an acidified bentonite clay.

36. A lubricant according to claim 28.

37. A lubricant according to claim 32.

38. A lubricant according to claim 35.

References Cited

UNITED STATES PATENTS

| | | |
|---|---|---|
| 3,373,111 | 3/1968 | Le Suer et al. |
| 3,374,174 | 3/1968 | Le Suer. |
| 3,401,118 | 9/1968 | Benoit _____ 44—63 X |
| 3,454,607 | 7/1969 | Le Suer et al. _____ 44—63 X |

DANIEL E. WYMAN, Primary Examiner

W. J. SHINE, Assistant Examiner

U.S. Cl. X.R.

44—63,71